(12) United States Patent
Xue et al.

(10) Patent No.: US 8,718,596 B1
(45) Date of Patent: May 6, 2014

(54) WIRELESS DEVICE LOCATION FOR EMERGENCY CALLS

(75) Inventors: Wen Xue, Overland Park, KS (US); Talat Jamshidi, Leawood, KS (US); Stevan A. Klesper, Ashburn, VA (US); Ihab Amin Guirguis, Aldie, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1001 days.

(21) Appl. No.: 12/369,833

(22) Filed: Feb. 12, 2009

(51) Int. Cl.
*H04M 11/04* (2006.01)
*H04W 24/00* (2009.01)

(52) U.S. Cl.
USPC .............. 455/404.2; 455/404.1; 455/456.2; 379/37; 379/45

(58) Field of Classification Search
USPC .......................... 455/404.2; 379/45
See application file for complete search history.

(56) References Cited

U.S. PATENT DOCUMENTS

| | | | |
|---|---|---|---|
| 7,245,900 B1 | 7/2007 | Lamb et al. | |
| 7,433,673 B1 | 10/2008 | Everson et al. | |
| 2006/0120517 A1* | 6/2006 | Moon et al. | 379/45 |
| 2007/0206730 A1* | 9/2007 | Polk | 379/37 |
| 2007/0213029 A1* | 9/2007 | Edney et al. | 455/404.1 |
| 2007/0263609 A1 | 11/2007 | Mitchell | |
| 2007/0263610 A1 | 11/2007 | Mitchell | |
| 2007/0263611 A1 | 11/2007 | Mitchell | |
| 2007/0288613 A1* | 12/2007 | Sudame et al. | 709/223 |

* cited by examiner

*Primary Examiner* — Olumide T Ajibade Akonai
*Assistant Examiner* — Natasha Cosme

(57) ABSTRACT

A wireless device identifier and an access point identifier are associated with location information that identifies a location associated with a network access point that is associated with the access point identifier. Call signaling information requesting a call to an emergency service is received from a wireless device connected wirelessly to the network access point via a wireless network connection. The access point identifier is received from the wireless device. Based on the access point identifier, and the wireless device identifier, the location information is retrieved. The location information is transferred to an emergency service system. The call for the emergency service is established to the emergency service system.

16 Claims, 7 Drawing Sheets

WIRELESS DEVICE LOCATION FOR EMERGENCY CALLS

TECHNICAL BACKGROUND

Telecommunication carriers are required by government regulations to provide emergency calling services to their customers. In the United States and Canada, 9-1-1 is the official emergency phone number that callers can dial in order to reach dispatch personnel at public safety answering points (PSAP). When a caller dials 911 from a telephone, the call is routed by a carrier to receiving equipment at a PSAP facility. A dispatcher at the facility answers the call and assists the caller with their emergency.

Often times, dispatchers must dispatch response personnel to the scene of an emergency to render assistance to callers or others involved in the emergency. In the past, dispatchers had to ask a caller for their location. Over time, most telecommunication carriers developed the capability to automatically determine the location of landline callers. For instance, landline callers can be located based on their phone number.

Most carriers have also implemented solutions for determining the location of mobile callers. Wireless carriers have employed several different solutions to locate callers in need of emergency service, such as the carrier's network providing, to the PSAP, the location of the cell tower servicing a call. In another example, wireless carriers may employ triangulation techniques to pinpoint the location of a caller. In yet another example, mobile devices with global position system (GPS) capability may provide their GPS coordinates to the carrier. The carrier in turn, provides these coordinates to the PSAP.

Overview

A method of operating a communication system is disclosed. A wireless device identifier, and an access point identifier, are associated with location information that identifies a location associated with a network access point that is associated with the access point identifier. Call signaling information requesting a call to an emergency service is received from a wireless device connected wirelessly to the network access point via a wireless network connection. The access point identifier is received from the wireless device. Based on the access point identifier, and the wireless device identifier, the location information is retrieved. The location information is transferred to an emergency service system. The call for the emergency service is established to the emergency service system.

A communication system is disclosed. A call processing system is configured to associate a wireless device identifier and an access point identifier with location information that identifies a location associated with a network access point that is associated with the access point identifier. The call processing system is also configured to receive call signaling information requesting a call to an emergency service from a wireless device connected wirelessly to the network access point via a wireless network connection. The call processing system is also configured to receive the access point identifier from the wireless device and retrieve the location information based on the access point identifier and the wireless device identifier. A communication network establishes the call for the emergency service to the emergency service system. An emergency call service system receives the location information.

A method of operating a mobile wireless device is disclosed. An access point identifier is received. A network access point associated with the access point identifier is connecting with wirelessly. A request to establish a call to an emergency service via a wireless network connection associated with the network access point is received. Call signaling information requesting the call to an emergency service is sent. The access point identifier is sent in association with the call signaling information requesting the call to the emergency service. The call for the emergency service is established to an emergency service system.

DETAILED DESCRIPTION

In an embodiment, a wireless device can connect to both a wide area cellular network and a local area wireless network. Examples of a local area wireless network are those networks based on the IEEE 802.11 (Wi-Fi) specifications. To connect to the local area wireless network, the phone receives an access point identifier, such as a service set identifier (SSID). When connected to a local area wireless network, a user may place a call to an emergency service, such as 911, that is to be carried by the local area wireless network. This call may be routed to a PSAP. In an embodiment, the access point identifier (e.g., SSID) acts as part of a key to lookup a location to be supplied to the PSAP.

This lookup may be performed on a database accessible via a network that is carrying the 911 call. Alternatively, the wireless device may search its own storage for location information associated with the access point identifier. The location information may be input by the user to the wireless device or the database. Alternatively, the location information may be supplied by local area wireless network access point as part of the dynamic host configuration protocol (DHCP) procedure for obtaining an internet protocol (IP) address.

Figure 1:
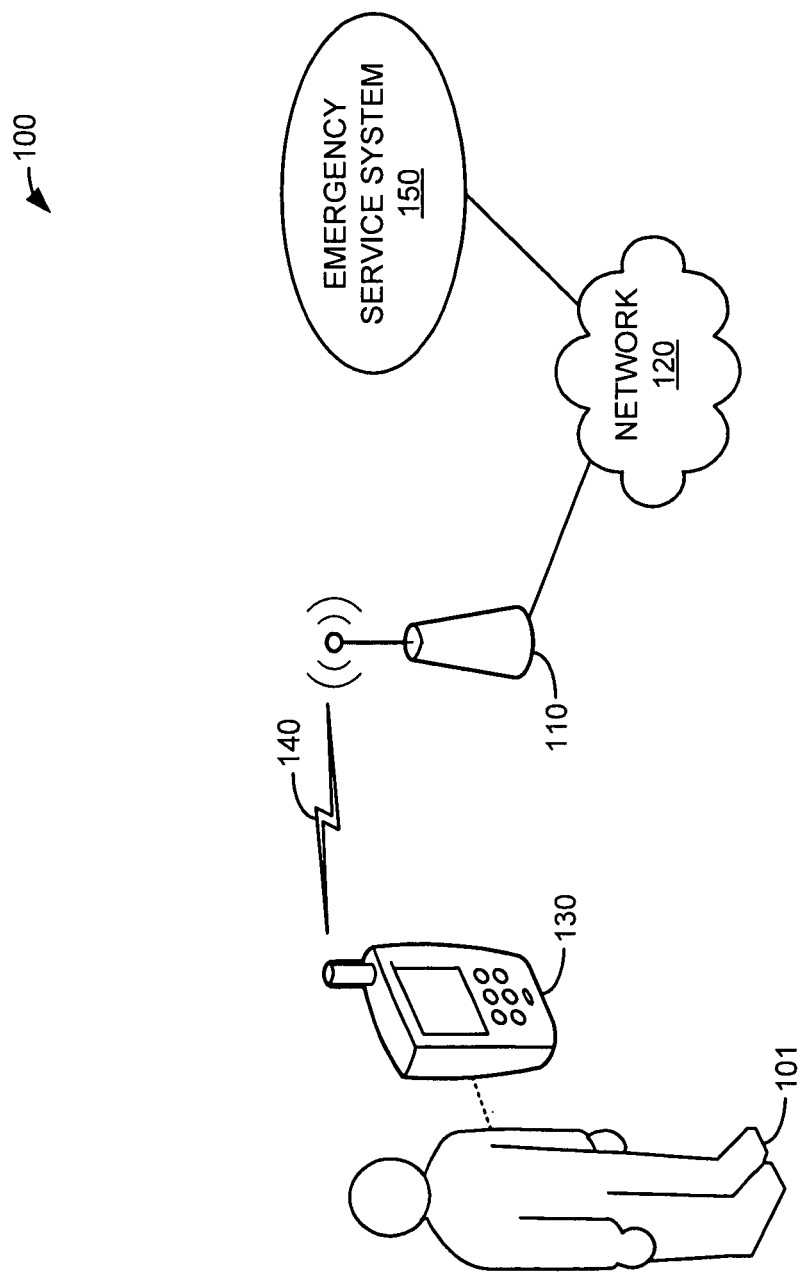
FIG. 1 is a block diagram illustrating a communication system.

FIG. 1 is a block diagram illustrating a communication system. In FIG. 1, communication system 100 comprises access point 110, network 120, wireless device 130 and emergency service system 150. Access point 110 is operatively coupled to network 120. Emergency service system 150 is operatively coupled to network 120. Wireless device 130 is operatively coupled to access point 110 via local area wireless link 140. Thus, user 101 may wirelessly place a call for emergency service to emergency service system 150 via wireless device 130, access point 110 and network 120.

In an embodiment, access point 110 provides the air-interface for a wireless local area network (WLAN). Wireless device 130 connects wirelessly to the WLAN provided by access point 110. Typically, access point 110 and wireless device 130 will be able to communicate wirelessly with each other at a maximum range of around 120 feet indoors to 300 feet outdoors.

Access point 110 may utilize one or more of IEEE 802.11 standards. IEEE 802.11 is a set of standards for wireless local area network computer communication. The IEEE 802.11 standards are also known by the term Wi-Fi. These standards were developed by the IEEE LAN/MAN Standards Committee (IEEE 802) for use in the 5 GHz and 2.4 GHz public spectrum bands.

Access point 110 may include a number of elements known to those skilled in the art comprising transceivers, power amplifiers, combiner, duplexer, and antennas. Access point 110 may include additional components such as a routing function, control function, or control computer. However, these additional components have been omitted from FIG. 1 for the sake of brevity.

Network 120 may be any network or collection of networks that couple, link, or otherwise operatively connect access point 110 with other devices or systems. Network 120 may include other secondary data networks. In an example, network 120 may include a backhaul network, a local network, a long distance network, a packet network, the internet, or any combination thereof, as well as other types of networks.

Emergency service system 150 is any system, network, or collection of networks capable of receiving and terminating an emergency call carried via network 120. In addition, emergency service system 150 is capable of receiving location information from network 120. This location information may be in various forms, such as an address, or latitude and longitude coordinates. The location information received may be relayed to emergency service providers.

Wireless device 130 may be any device, system, combination of devices, or other such communication platform capable of communicating with access point 110 via local area wireless link 140. Wireless device 130 may use communication aspects specified by the 802.11 specifications. Wireless device 130 may also be able to communicate with a wide area cellular network.

For example, wireless device 130 may also be able to communicate with a wide area code division multiple access (CDMA) network. For example, wireless device 130 may be able to communicate with a TIA-856 specified network. A TIA-856 specified network may also be known as an Evolution-Data Optimized (EV-DO) network. In another example, wireless device 130 may also be able to communicate with a network specified by the IEEE 802.16 (WiMAX) set of standards. Wireless device 130 may also be able to communicate with other wide area wireless networks, such as long-term evolution (LTE) networks as specified by the European Telecommunications Standards Institute (ETSI).

Wireless device 130 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with access point 110 via local area wireless link 140. Other types of communication platforms are possible.

In an embodiment, access point 110 provides an access point identifier to wireless device 130. This access point identifier typically identifies access point 110 to devices that are seeking to connect to access point 110. For example, an 802.11 specified access point may broadcast a service set identifier (SSID) or extended service set identifier (ESSID). An SSID is a name used to identify a particular 802.11 wireless LAN. Wireless device 130 receives broadcast messages from all access points 110 within range that are advertising their SSIDs. Thus, wireless device 130 can choose an access point to connect to based on a pre-configuration. Alternatively, wireless device 130 may choose an access point by displaying a list of SSIDs in range and asking the user to select one.

The access point identifier broadcast by access point 110 may be associated with location information that identifies a location. This location may be associated with the location of access point 110. This association may be stored and maintained in access point 110, or wireless device 130. The association stored in access point 110 may be set by an administrator of access point 110. The association stored in access point 110 may be sent to, and stored by, wireless device 130. For example, the association stored in access point 110 may be sent to, and stored by, wireless device 130 during registration. The association may be sent during the DHCP process for obtaining an IP address from access point 110. The association stored in wireless device 130 may be set by a user of wireless device 130.

To illustrate by example, wireless device 130 may associate an SSID="OFFICE" to "199 South Briggs Street, Erie, Colo." Another example may be an association between an SSID="Bobs Network" and "8562 Llama Lane, Windsor, Colo.; lat=38.50123, long=−104.354." Another example may be an association between an SSID="library" and "lat=38.206, long=−104.141."

Once wireless device 130 is wirelessly connected to access point 110, user 101 may place an emergency call using wireless device 130. Typically, user 101 would dial 911 in order to place the call. In response, wireless device 130 transfers 911 call signaling to network 120. This call signaling may be used to setup a voice call from wireless device 130 to emergency service system 150 via network 120.

The call signaling may be sent using session initiation protocol (SIP). In addition to the call signaling necessary to setup the 911 call, wireless device 130 may send the location information that identifies a location associated with the location of access point 110. For example, wireless device 130 may send a SIP protocol message of the form:

P-Access-Info: "hotspot", address="6220 Sprint Parkway, OP, KS 66215"

This location information may be transferred by network 120 to emergency service system 150. This location information may be transferred by network 120 using, for example, the SIP protocol. In another example, network 120 may transfer the location information using a protocol typically used to communicate location information to emergency service providers. Network 120 may then establish the 911 call between wireless device 130 and emergency service system 150.

Figure 2:
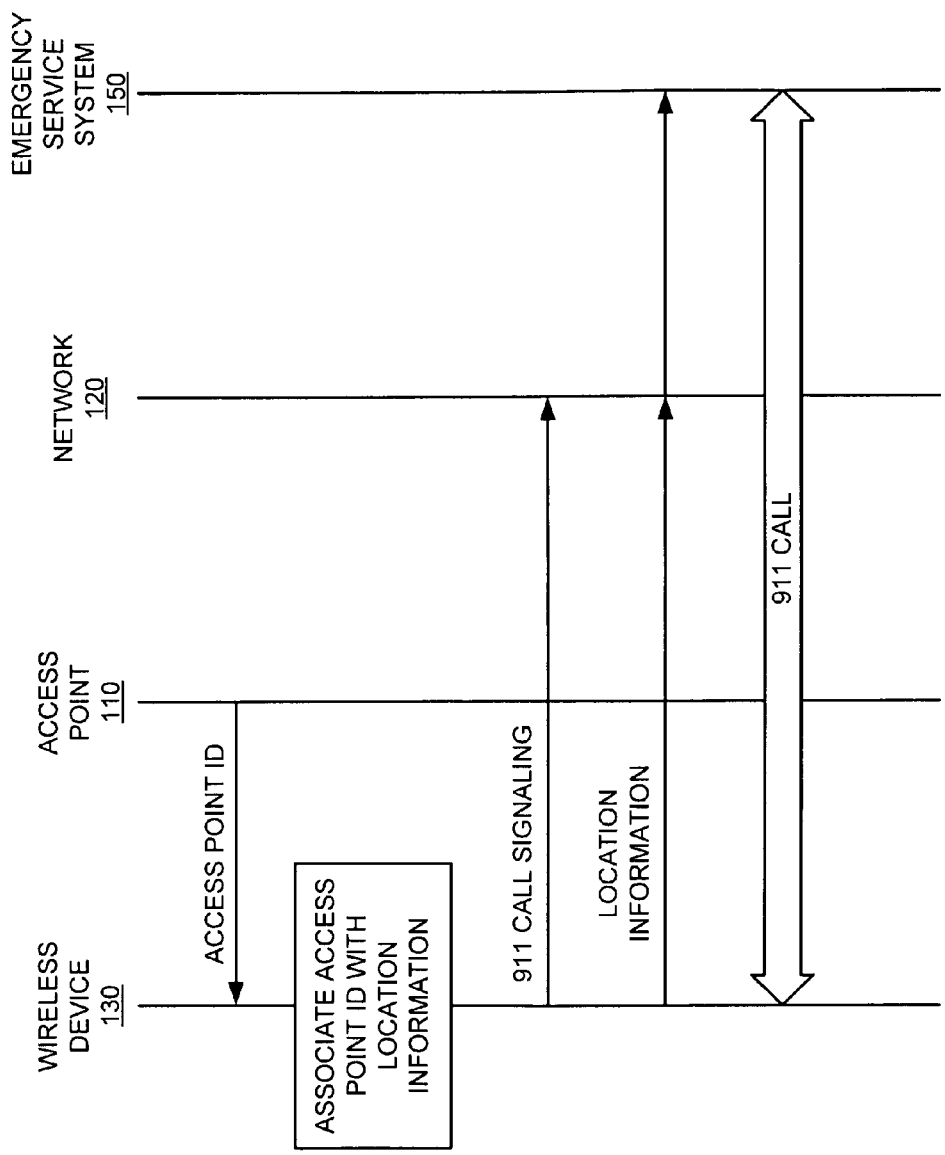
FIG. 2 is a flow diagram illustrating a method of operating a communication system.

FIG. 2 is a flow diagram illustrating a method of operating a communication system. As shown in FIG. 2, access point 110 sends an access point identifier to wireless device 130. This access point identifier typically identifies access point 110 to devices that are seeking to connect to access point 110. For example, access point 110 may broadcast an SSID or ESSID that is received by wireless device 130.

Wireless device 130 associates the access point identifier with location information. For example, wireless device 130 may store location information corresponding to access point 110. This location information may be tied to access point 110 by the access point identifier that access point 110 sent. Thus, when wireless device 130 is connected to access point 110, it can determine location information for access point 110 by retrieving the location information associated with the access point identifier that access point 110 sent. The association stored in wireless device 130 may be set by a user 101 of wireless device 130.

When a 911 call is placed by user 101 operating wireless device 130, wireless device 130 sends 911 call signaling information to network 120. This signaling information may be used by network 120 to setup a 911 call between wireless device 130 and emergency service system 150. Wireless device 130 also sends, to network 120, the location information associated with the access point identifier it received.

Network 120 transfers the location information to emergency service system 150. Network 120 establishes the 911 call between wireless device 130 and emergency service system 150.

Figure 3:
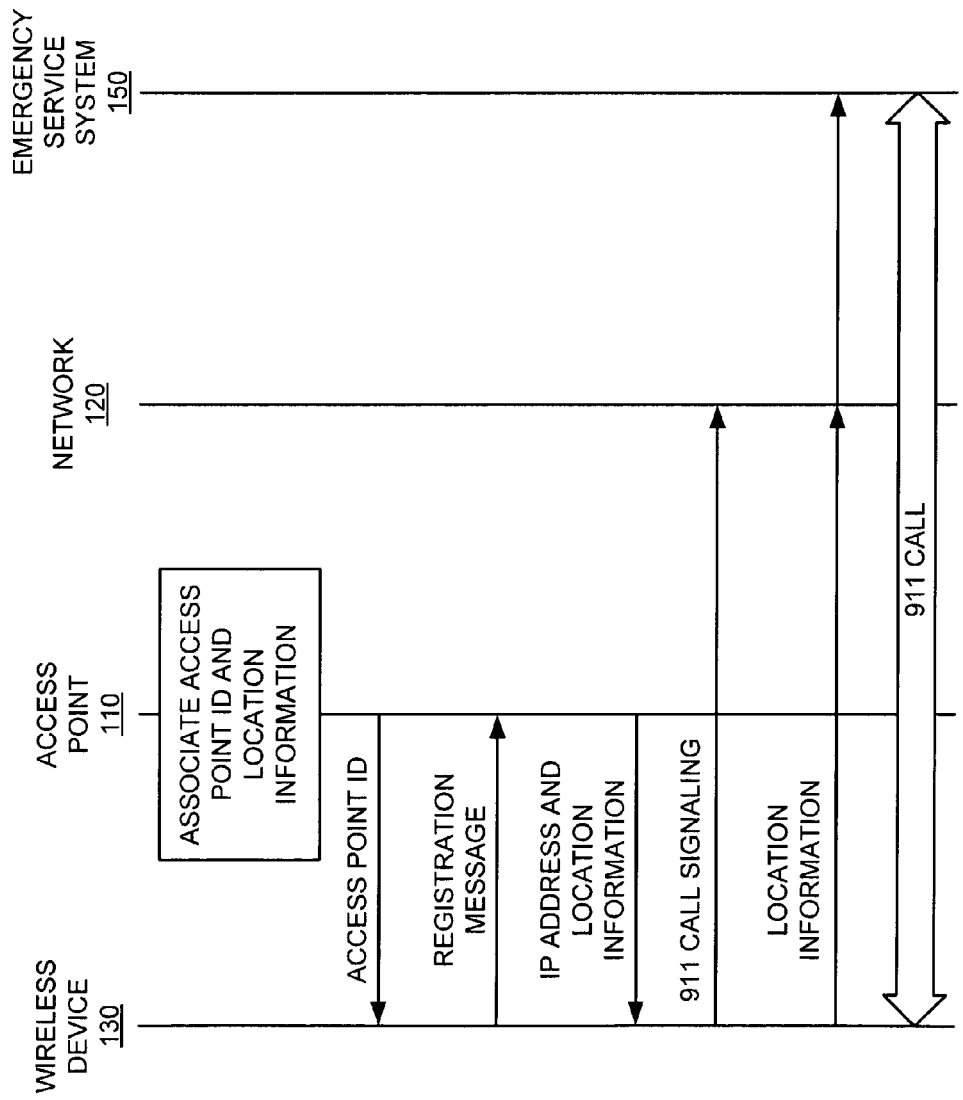
FIG. 3 is a flow diagram illustrating a method of operating a communication system.

FIG. 3 is a flow diagram illustrating a method of operating a communication system. As shown in FIG. 3, access point 110 is pre-provisioned with an association between its access point identifier and location information. Access point 110 sends the access point identifier to wireless device 130. For example, access point 110 may broadcast an SSID or ESSID. Wireless device 130 sends a registration message to access point 110. This registration message informs access point 110 that wireless device 130 is seeking to use access point 110 to communicate with network 120.

Access point 110 sends an IP address and the location information to wireless device 130. For example, as part of the DHCP process for setting the dynamic IP address that wireless device 130 is to use, access point 110 may also send the location information. For example, access point 110 may send the location information included in a vendor specific area of a DHCP protocol message. Wireless device 130 may associate this location information with the access point 110's access point identifier. Thus, as long as wireless device is using access point 110, it may store a location associated with that access point identifier.

When a 911 call is placed by user 101 operating wireless device 130, wireless device 130 sends 911 call signaling information to network 120. This signaling information may be used by network 120 to setup a 911 call between wireless device 130 and emergency service system 150. Wireless device 130 also sends, to network 120, the location information associated with the access point identifier it received.

Network 120 transfers the location information to emergency service system 150. Network 120 establishes the 911 call between wireless device 130 and emergency service system 150.

Figure 4:
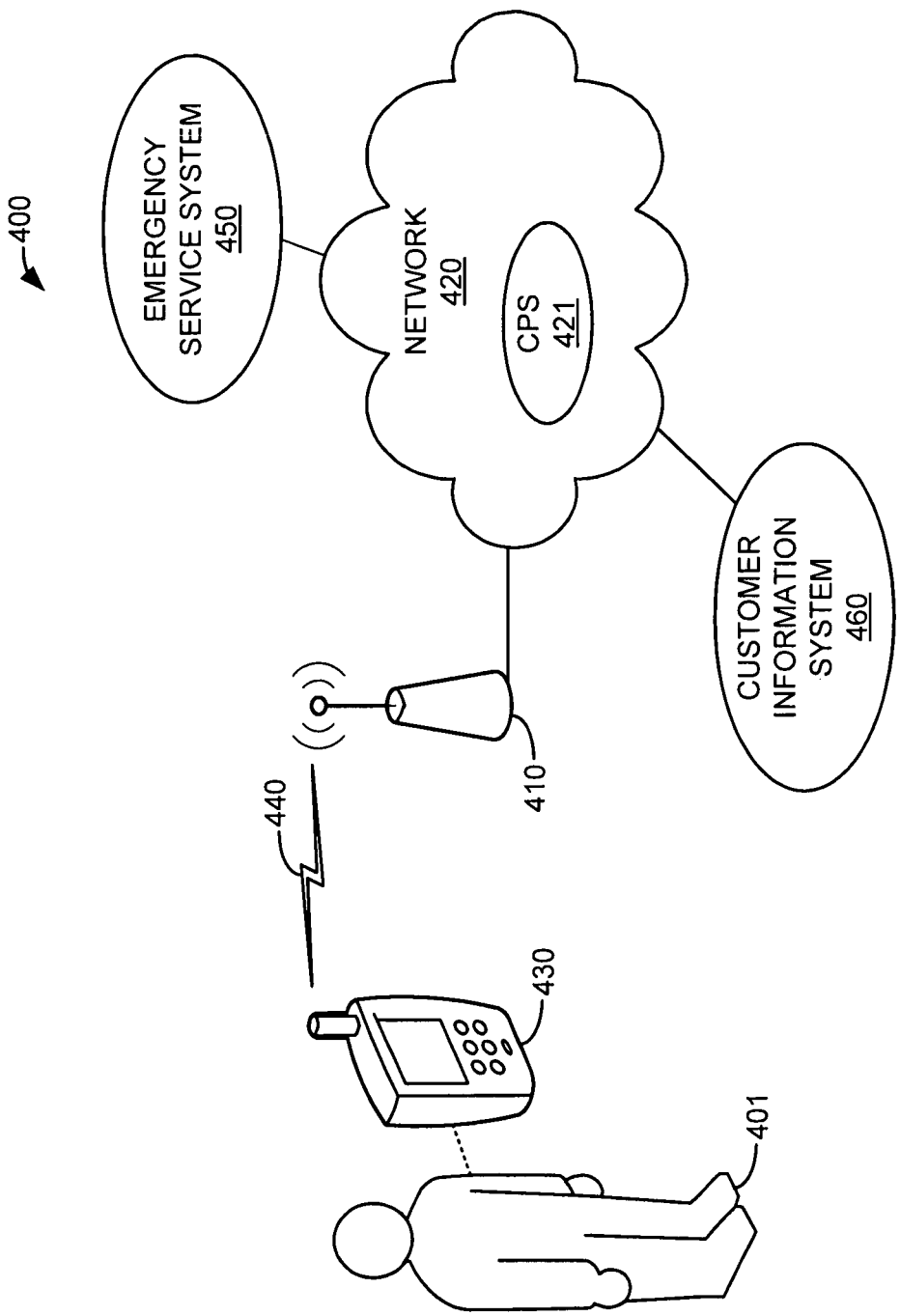
FIG. 4 is a block diagram illustrating a communication system.

FIG. 4 is a block diagram illustrating a communication system. In FIG. 4, communication system 400 comprises access point 410, network 420, wireless device 430, emergency service system 450, and customer information system 460. Network 420 includes call processing system (CPS) 421. Access point 410 is operatively coupled to network 420. Emergency service system 450 is operatively coupled to network 420.

Wireless device 430 is operatively coupled to access point 410 via local area wireless link 440. Thus, user 401 may place a wireless call for emergency service to emergency service system 450 via wireless device 430, access point 410, and network 420. This wireless call for emergency service may be setup by call processing system 421. Customer information system 460 is operatively coupled to network 420. Thus, location or other information stored in customer information system 460 may be transferred by network 420 and/or call processing system 421 to emergency service system 450.

In an embodiment, access point 410 provides the air-interface for a wireless local area network (WLAN). Wireless device 430 connects wirelessly to the WLAN provided by access point 410. Typically, access point 410 and wireless device 430 will be able to communicate wirelessly with each other at a maximum range of around 120 feet indoors to 300 feet outdoors.

Access point 410 may utilize one or more of the IEEE 802.11 standards. Access point 410 may include a number of elements known to those skilled in the art comprising transceivers, power amplifiers, combiner, duplexer, and antennas. Access point 410 may include additional components such as a routing function, control function, or control computer. However, these components have been omitted from FIG. 4 for the sake of brevity.

Network 420 may be any network or collection of networks that couple, link, or otherwise operatively connect access point 410 with other devices or systems. Network 420 may include other secondary data networks. In an example, network 420 may include a backhaul network, a local network, a long distance network, a packet network, the internet, or any combination thereof, as well as other types of networks.

Call processing system 421 is any system or collection of systems capable of receiving and processing emergency calls from wireless device 430 to connect the calls to emergency service system 450 via network 420. Examples of call processing systems include, but are not limited to, mobile switching centers, soft switches, or circuit switched telephony switches. Other types of call processing systems are possible. Call processing system 421 is also capable of communicating with wireless device 430, access point 410, and customer information system 460. In an embodiment, call processing system 421 may also perform one or more functions of customer information system 460. For example, call processing system 421 may store location information in association with an access point identifier and/or a wireless device identifier.

Emergency service system 450 is any system, network, or collection of networks capable of receiving and terminating an emergency call carried via network 420. In addition, emergency service system 450 is capable of receiving location information from customer information system 460 via network 420. This location information may be in various forms, such as an address, or latitude and longitude coordinates. The location information received may be relayed to emergency service providers.

Wireless device 430 may be any device, system, combination of devices, or other such communication platform capable of communicating with access point 410 via wireless link 440. Wireless device 430 may use communication aspects specified by the 802.11 specifications. Wireless device 430 may also be able to communicate with a wide area cellular network.

For example, wireless device 430 may also be able to communicate with a wide area CDMA network. Wireless device 430 may be able to communication with an EV-DO network. In another example, wireless device 430 may also be able to communicate with a network specified by the WiMAX set of standards. Wireless device 430 may also be able to communicate with other wide area wireless networks, such as LTE.

Wireless device 430 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with access point 410 via local area wireless link 440. Other types of communication platforms are possible.

Customer information system 460 is any system capable of storing location information in association with an access point identifier and/or a wireless device identifier. An access point identifier typically identifies an access point to devices that are seeking to connect to that access point. For example, an access point may broadcast an SSID or ESSID. A wireless device identifier may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible.

Customer information system 460 can store individual files, documents, or records, as well as other types of data or information, for multiple users, wireless devices, and/or access points. Each item of information, whether a file, a document, or a record, can be stored in association with an access point identifier and wireless device identifier. In particular, the customer information system 460 stores location information associated with an access point identifier and wireless device identifier that identifies a location associated with the location of access point 410.

In an embodiment, access point 410 provides an access point identifier to wireless device 430. This access point identifier typically identifies access point 410 to devices that are seeking to connect to access point 410. For example, access point 410 may broadcast an SSID or ESSID. Wireless device 430 receives broadcast messages from all access points 410 within range advertising their SSIDs. Thus, wireless device 430 can choose access point 410 to connect to based on a pre-configuration, or by displaying a list of SSIDs in range and asking the user 401 to select one.

The access point identifier broadcast by access point 410 may be associated with location information that identifies a location. This location may be associated with the location of access point 410. This association is be stored and maintained in customer information system 460.

In an embodiment, the association stored in customer information system 460 may be set by a user 401 of wireless device 430. In an embodiment, the association stored in customer information system 460 may be set by the operator of access point 410. A standardized record may exist for each access point 410 or access point identifier represented in customer information system 460. The standardized record may be data-filled via a network user interface, such as a web browser.

To illustrate by example, customer information system 460 may associate an SSID="OFFICE" and a wireless device identifier associated with wireless device 430 to "199 South Briggs Street Maple Lane, Erie, Colo." Another example may be an association between wireless device 430, SSID="Bobs Network" and "8562 Llama Lane, Windsor, Colo.; lat=38.50123, long=−104.354." Another example may be an association between wireless device 430, SSID="library" and "lat=38.206, long=−104.141."

Once wireless device 430 is wirelessly connected to access point 410, user 401 may place an emergency call using wireless device 430. Typically, user 401 would dial 9-1-1 in order to place the call. In response, wireless device 430 transfers 911 call signaling to network 420 and/or call processing system 421. This call signaling may be used by call processing system 421 to setup a voice call from wireless device 430 to emergency service system 450 via network 420. The call signaling may be sent using session initiation protocol (SIP). In addition to the call signaling necessary to setup the 911 call, wireless device 430 may send the access point identifier of access point 410, and the wireless device identifier of wireless device 430, to network 420 and/or call processing system 421. Network 420 or call processing system 421 may transmit the access point identifier and the wireless device identifier to customer information system 460.

In response, customer information system 460 may retrieve the location information associated with the received access point identifier and the wireless device identifier. This location information is transferred to network 420. The location information is transferred by network 420 or call processing system 421 to the emergency service system 450. In an example, network 420 or call processing system 421 may transfer the location information using a protocol typically used to communicate location information to emergency service providers. Network 420 or call processing system 421 may then establish the 911 call between wireless device 430 and emergency service system 450.

Figure 5:
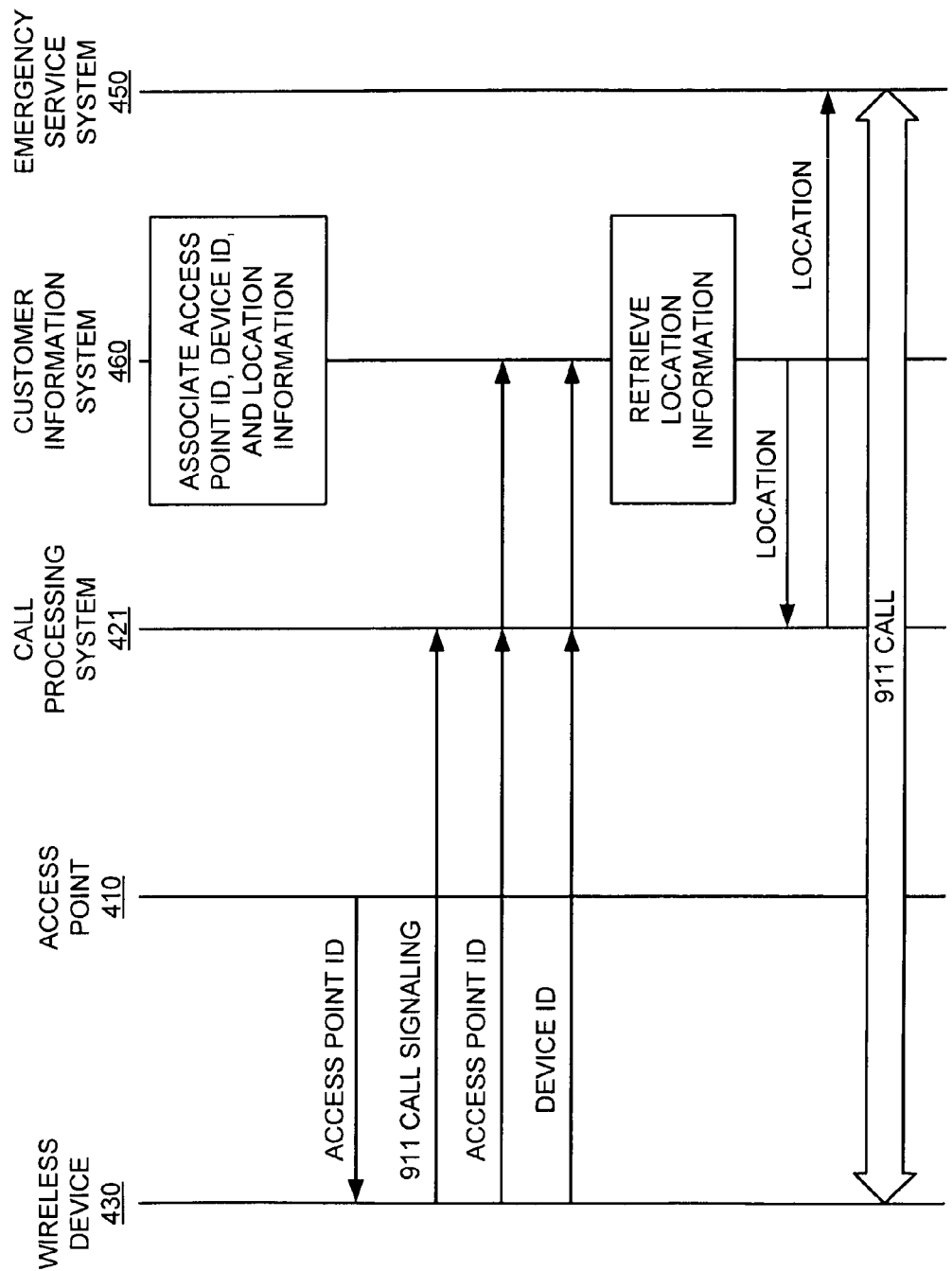
FIG. 5 is a flow diagram illustrating a method of operating a communication system.

FIG. 5 is a flow diagram illustrating a method of operating a communication system. As shown if FIG. 5, customer information 460 system associates an access point identifier and a wireless device identifier with location information. Access point 410 sends an access point identifier to wireless device 430. This access point identifier typically identifies access point 410 to devices that are seeking to connect to access point 410. For example, access point 410 may broadcast an SSID or ESSID.

When a 911 call is placed by user 401 operating wireless device 430, wireless device 430 sends 911 call signaling information to call processing system 421. This signaling information may be used by call processing system 421 to setup a 911 call between wireless device 430 and emergency service system 450 via network 420. Wireless device 430 also sends, to call processing system 421, its wireless device identifier and the access point identifier associated with access point 410.

Call processing system 421 sends the wireless device identifier and the access point identifier to customer information system 460. In response, customer information system 460 retrieves the location information associated with the access point identifier and the wireless device identifier. This location information is transferred to call processing system 421. The location information is then transferred by call processing system 421 to the emergency service system 450 via network 420. In an example, call processing system 421 may transfer the location information using a protocol typically used to communicate location information to emergency service providers. Call processing system 421 establishes the 911 call between wireless device 430 and emergency service system 450 via network 420.

Figure 6:
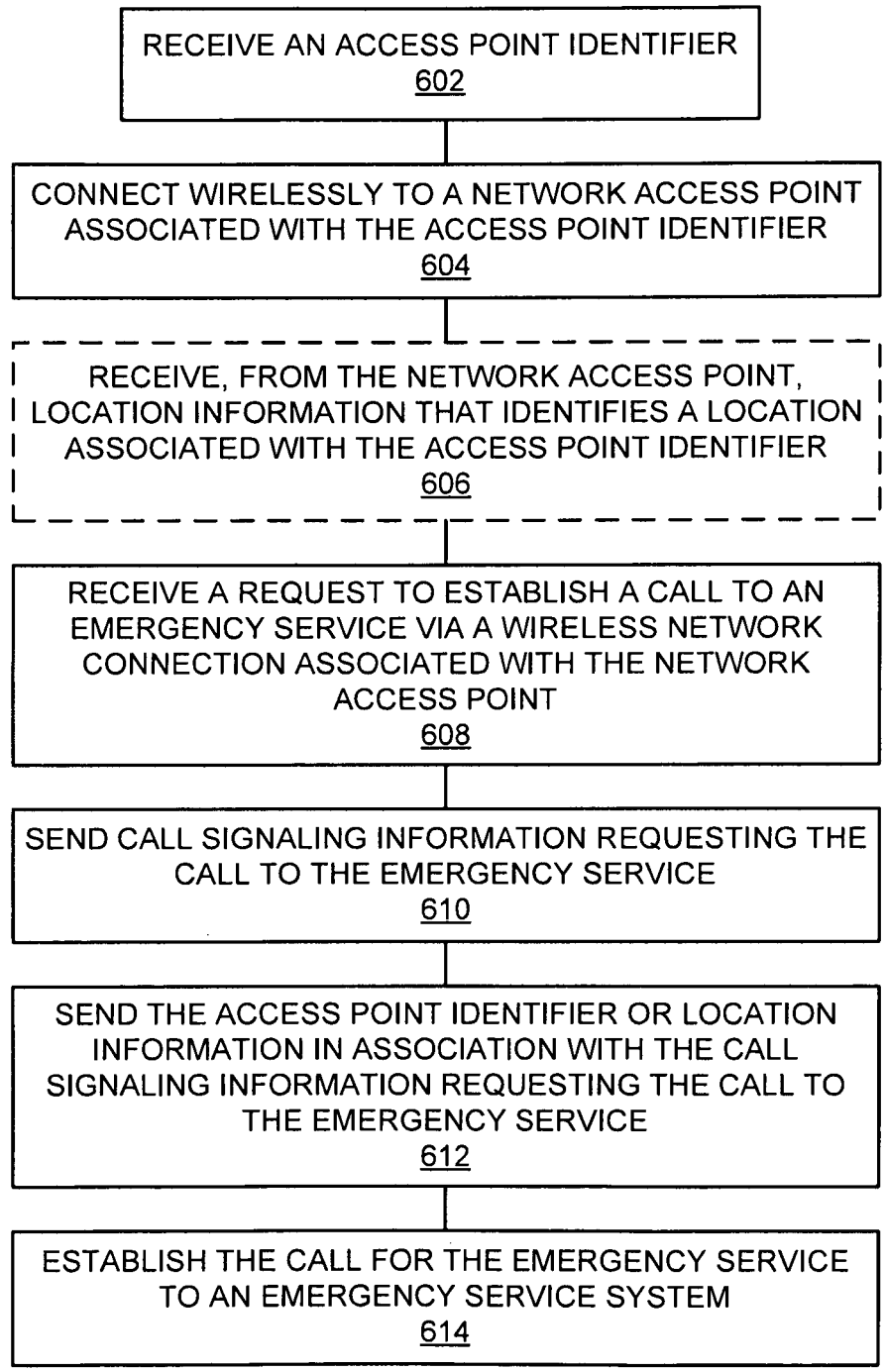
FIG. 6 is a flowchart illustrating a method of operating a mobile wireless device.

FIG. 6 is a flowchart illustrating a method of operating a mobile wireless device. The steps illustrated in FIG. 6 may be performed by one or more elements of communication system 100 or communication system 400. An access point identifier is received (602). For example, wireless device 130 may receive and access point identifier from access point 110. A network access point associated with the access point identifier is connected to wirelessly (604). For example, wireless device 130 may connect wirelessly to access point 110.

From the network access point, location information that identifies a location associated with the access point identifier is received (606). This block is optional and is thus shown in FIG. 6 with a dashed border. For example, wireless device 130 may optionally receive location information from access point 110. This location information may identify a location associated with the access point identifier broadcast by access point 110. Wireless device 130 may receive the location information as part of a dynamic host configuration process.

A request to establish a call to an emergency service via a wireless network connection associated with the network access point is received (608). For example, wireless device 130 may receive a request from user 101 to establish a 911 call to emergency service provider 150. This 911 call may be carried via wireless link 140.

Call signaling information requesting the call to the emergency service is sent (610). For example, wireless device 130 may send, to network 120, call signaling information requesting a 911 call to emergency service system 150. The access point identifier or location information is sent in association with the call signaling information requesting the call to the emergency service (612). For example, wireless device 130 may send the access point identifier of access point 110 in association with the 911 call signaling information. In another example, wireless device 130 may send the location information it received in block 606 in association with the 911 call signaling information.

The call for the emergency service is established to an emergency service system (614). For example, a 911 call between wireless device 130 and emergency service system 150 may be established.

The methods, systems, networks, and devices described above may be implemented with or executed by one or more computer systems. The methods described above may also be stored on a computer readable medium. Many of the elements of communication system 100 and communication system 400 may be, comprise, or include computers systems. This includes, but is not limited to access point 110, network 120, wireless device 130, emergency service system 150, access point 410, network 420, call processing system 421, wireless device 430, emergency service system 450, and customer information system 460.

Figure 7:
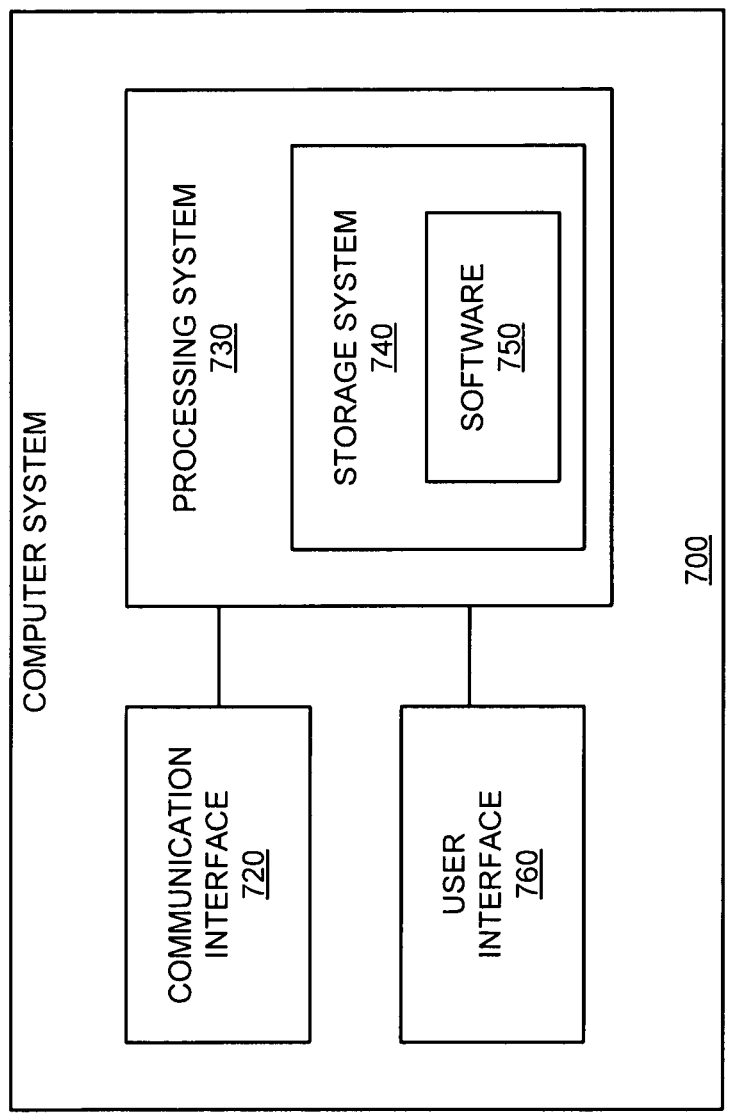
FIG. 7 is a block diagram of a computer system.

FIG. 7 illustrates a block diagram of a computer system. Computer system 700 includes communication interface 720, processing system 730, and user interface 760. Processing system 730 includes storage system 740. Storage system 740 stores software 750. Processing system 730 is linked to communication interface 720 and user interface 760. Computer system 700 could be comprised of a programmed general-purpose computer, although those skilled in the art will appreciate that programmable or special purpose circuitry and equipment may be used. Computer system 700 may be distributed among multiple devices that together comprise elements 720-760.

Communication interface 720 could comprise a network interface, modem, port, transceiver, or some other communication device. Communication interface 720 may be distributed among multiple communication devices. Processing system 730 could comprise a computer microprocessor, logic circuit, or some other processing device. Processing system 730 may be distributed among multiple processing devices. User interface 760 could comprise a keyboard, mouse, voice recognition interface, microphone and speakers, graphical display, touch screen, or some other type of user device. User interface 760 may be distributed among multiple user devices. Storage system 740 could comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a computer system. Software 750 could comprise an application program, firmware, or some other form of machine-readable processing instructions. When executed by processing system 730, software 750 directs processing system 730 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    associating at least a network identifier of a network access point with a geographic location of the network access point;
    receiving call signaling information requesting a call to an emergency service from a wireless user device which receives wireless network access from the network access point;
    based on at least the network identifier of the network access point, identifying the geographic location of the network access point, wherein the geographic location of the network access point is received by the wireless user device during a dynamic host configuration (DHCP) process with the network access point;
    transferring the geographic location of the network access point for delivery to an emergency service system for use as a location of the wireless user device for the call to the emergency service, wherein the wireless user device transfers the geographic location of the network access point with the call signaling information for delivery to the emergency service system; and,
    establishing the call for the emergency service to the emergency service system.

2. The method of claim 1, wherein the network identifier of the network access point comprises a service set identifier (SSID) of the network access point as broadcast by the network access point and received by the wireless user device, and wherein the SSID of the network access point is provided by the wireless user device with the call signaling information.

3. The method of claim 1, wherein the geographic location of the network access point is received by the wireless user device from the network access point during a wireless network registration process with the network access point, and wherein the wireless user device transfers the geographic location of the network access point with the call signaling information for delivery to the emergency service system.

4. The method of claim 1, wherein the geographic location of the network access point is provided in a vendor specific area of a DHCP protocol message during the DHCP configuration process.

5. The method of claim 1, wherein a user inputs the geographic location of the network access point into the wireless user device, and wherein the wireless user device transfers the geographic location of the network access point with the call signaling information for delivery to the emergency service system.

6. The method of claim 1, wherein the geographic location of the network access point is stored in the network access point and provided to the wireless user device during a wireless network registration process.

7. The method of claim 1, wherein the geographic location of the network access point is stored by a location information system, wherein the location information system provides the geographic location of the network access point for delivery to the emergency service system, and wherein the wireless user device provides the network identifier of the network access point for receipt by the location information system.

8. The method of claim 1, wherein in a location information system coupled to a network that establishes the call for the emergency service to the emergency service system:
    storing the geographic location of the network access point;

associating the network identifier of the network access point with the geographic location of the network access point;

identifying the geographic location of the network access point responsive to at least receiving the network identifier of the network access point with the call signaling information; and providing the geographic location of the network access point for delivery to the emergency service system for use as a location of the wireless user device for the call to the emergency service.

9. A communication system, comprising:

a storage system configured to associate at least a network identifier of a network access point with a geographic location of the network access point;

a communication network configured to receive call signaling information requesting a call to an emergency service from a wireless user device which receives wireless network access from the network access point;

a processing system configured to identify the geographic location of the network access point based on at least the network identifier of the network access point, wherein the geographic location of the network access point is received by the wireless user device during a dynamic host configuration (DHCP) process with the network access point;

the communication network configured to establish the call for the emergency service to the emergency service system; and the emergency service system configured to receive the geographic location of the network access point from the communication network for use as a location of the wireless user device for the call to the emergency service, wherein the wireless user device transfers the geographic location of the network access point with the call signaling information for delivery to the emergency service system.

10. The communication system of claim 9, wherein the network identifier of the network access point comprises a service set identifier (SSID) of the network access point as broadcast by the network access point and received by the wireless user device, and wherein the SSID of the network access point is provided by the wireless user device with the call signaling information.

11. The communication system of claim 9, wherein the geographic location of the network access point is received by the wireless user device from the network access point during a wireless network registration process with the network access point.

12. The communication system of claim 9, wherein the geographic location of the network access point is provided in a vendor specific area of a DHCP protocol message during the DHCP configuration process.

13. The communication system of claim 12, wherein a user inputs the geographic location of the network access point into the wireless user device.

14. The communication system of claim of claim 9, wherein the geographic location of the network access point is stored in the network access point and provided to the wireless user device during a wireless network registration process, and wherein the wireless user device comprises the storage system and the processing system.

15. The communication system of claim of claim 9, wherein the geographic location is stored by the communication network, wherein the communication network provides the geographic location of the network access point for delivery to the emergency service system, wherein the communication network comprises the storage system and the processing system, and wherein the wireless user device provides the network identifier of the network access point for receipt by the communication network.

16. A method of operating a wireless user device, comprising:

receiving a network identifier of a network access point;

receiving wireless network access from the network access point;

identifying a geographic location of the network access point based on at least the network identifier of the network access point by at least receiving the geographic location of the network access point during a dynamic host configuration (DHCP) process with the network access point;

receiving a user request to establish a call to an emergency service over the wireless network access provided by the network access point;

sending call signaling information requesting the call to the emergency service;

sending the geographic location of the network access point with the call signaling information for use as a location of the wireless user device for the call to the emergency service; and establishing the call for the emergency service to an emergency service system.

* * * * *